United States Patent [19]
Celenze

[11] Patent Number: 4,758,853
[45] Date of Patent: Jul. 19, 1988

[54] SLR CAMERA

[76] Inventor: Greg A. Celenze, 2151 E. Lincoln Hwy., Apt. L-10, Levittown, Pa. 19056

[21] Appl. No.: 126,712

[22] Filed: Nov. 30, 1987

[51] Int. Cl.⁴ .............................................. G03B 19/12
[52] U.S. Cl. .................................................... 354/152
[58] Field of Search ......................................... 354/152

[56] References Cited
U.S. PATENT DOCUMENTS

| 494,354 | 3/1893 | Tracy et al. | 354/152 X |
| 3,654,844 | 4/1972 | Hampton | 354/152 X |

Primary Examiner—Michael L. Gellner
Attorney, Agent, or Firm—Daniel E. Kramer

[57] ABSTRACT

A single lens reflex camera having no flop-up mirror but instead having a focal plane shutter positioned in the same plane that a flop-up mirror would have occupied, with the side of the focal plane shutter facing the lens silvered to act in place of the flop-up mirror.

5 Claims, 2 Drawing Sheets

SLR CAMERA

BACKGROUND OF THE INVENTION

1. Field of the Invention

This invention pertains to cameras and particularly pertains to single lens reflex cameras.

2. Description of the Prior Art

The best prior art known to me is a conventional, single lens reflex camera as shown in FIG. 1. The camera has a box 10, film 36 and a focal plane shutter 14 with rollers 16 and 18 for carrying and moving the focal plane shutter. A flop-up mirror 20 is hinged at its uppermost point 21 and has a focusing position 22 and a picture taking position 24. Lens 30 is mounted in barrel 34 which is slideably moveable for focusing. Diaphragm 32 is mounted in barrel 34 for adjusting the aperture. During the focusing period, light transmitted by lens 30 is reflected from mirror 20 and focused on ground glass 26. The condition of focus and the contents of the scene about to be photographed are observed on ground glass 26 through focusing hood 28. A pentaprism with focusing screen and an eyepiece could be substituted for ground glass 26 and focusing hood 28.

In cameras of the Graflex style, mirror 20 is spring-biased toward its picture taking position 24 and is held in the focusing position 22 by a catch (not shown). When the focus and composition of the picture is satisfactory to the photographer, she releases the catch, the mirror 20 rotates upward to position 24, at the same time releasing the focal plane shutter causing the spring rollers to wind the curtain and the slot embedded in the curtain past the film 36 making the exposure. The act of taking the picture blots out the scene to the photographer until he resets the mirror 20 to its focusing and composing position 22. In the more complex cameras such as the Nikon Model FE, a complex mechanism is provided which on release causes the mirror to rotate from focusing/composition position 22 to position 24, actuating the focal plane shutter and then immediately rotating the mirror 20 back to its composing focusing position 22. These complex and precisely timed actions of the mirror 20 are totally eliminated in my invention by the simple expedient of moving the focal plane shutter into the same plane occupied by mirror 20 in its focusing and composing position and silvering the side of the shutter facing lens 30.

Other prior art is exemplified by the Pentax Auto 110 and the Kodak 126 SLR cameras. Both of these are single lens reflex cameras having a swing-up mirror but no focal plane shutter. In both of these cameras, the swing-up mirror acts as the shutter by remaining in the "up" position for the required duration of the exposure.

FIG. 2 shows a side elevation view of the interior of this type of camera. The construction is like that of the prior art of FIG. 1 except there is no focal plane shutter 14 or rollers 16 and 18. Instead, there is a mechanism (not shown) which quickly moves mirror 20 from focusing position 22 to picture taking position 24; holding it there for the required or preset duration of the exposure, then returning the mirror 20 to the focusing position, thereby cutting off light flow to film 36, terminating the exposure.

BRIEF SUMMARY OF THE INVENTION

I have invented a single lens reflex camera in which the swinging two position mirror is replaced by a focal plane shutter fixedly positioned in the same plane that a mirror would have occupied in its focusing and composition position. The focal plane shutter is silvered on the side of the shutter facing the lens. The object of my invention is to substantially simplify the mechanism required in the construction of single lens reflex cameras. It is a further object of my invention to provide the photographer a view of the subject through the viewfinder which is substantially uninterrupted. It is a further object of my invention to provide a single lens reflex camera having a mirror shutter in a fixed plane and not capable of swinging or pivoting.

DETAILED DESCRIPTION OF THE INVENTION

Figure 1:
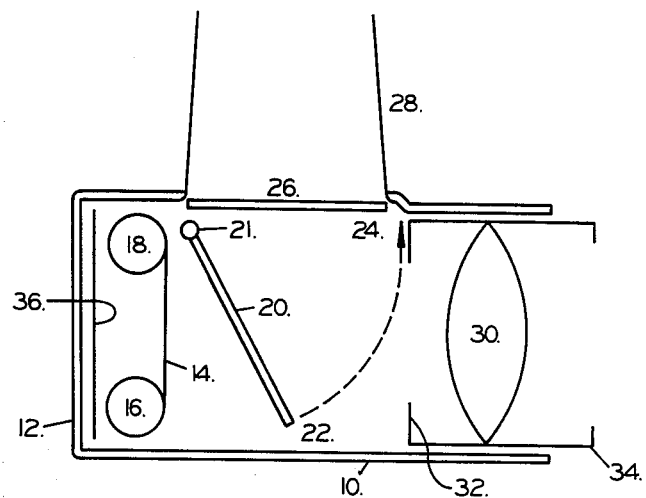
FIG. 1 (Prior Art) is a cross-section in elevation of a single lens reflex camera of the Graflex type having a swinging mirror.
Figure 2:
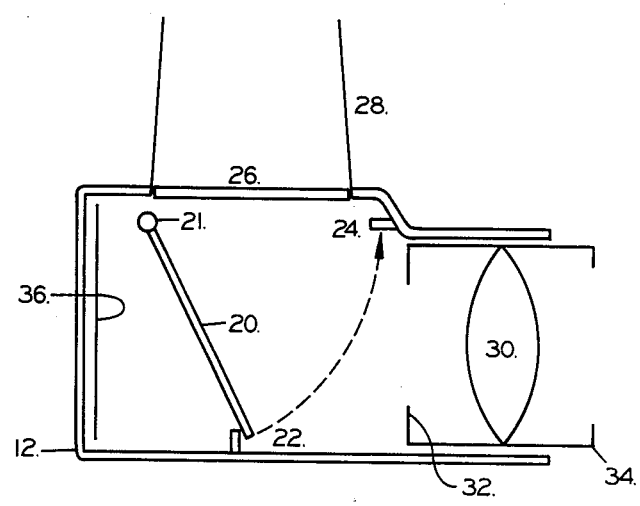
FIG. 2 (Prior Art) is a cross-section of a single lens reflex camera where the swinging mirror is the shutter.

The operation of the prior art camera of FIGS. 1 and 2 have been described in detail under the Prior Art heading in this specification.

Figure 3:
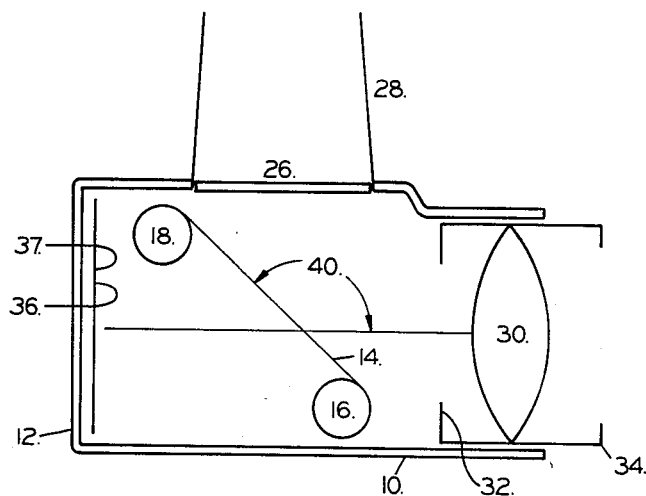
FIG. 3 is a single lens reflex camera employing my invention having a focal plane shutter with upper and lower rollers and a silvered curtain positioned in the plane that would have been occupied by the prior art swinging mirror.

FIG. 3, which displays one version of my invention, has camera box 10 with film 37 positioned in the film plane 36. Film 37 may be of the roll film type or plate or film pack and may be positioned by any of the well-known mechanisms used for this purpose.

Within Box 10 is located barrel 34 which contains lens 30 and diaphragm 32 and has provisions for controllably moving barrel 34 toward and away from film plane 36 and means for adjusting the size of diaphragm 32. Various scales may be provided to allow the photographer to monitor these functions, typical scales are: feet or meters associated with the distance of lens 30 from film plane 36 and indicating the distance of a subject which would be in focus at each position of lens 30 with respect to plane 36; "f." numbers associated with the degree of opening of diaphragm 32. A focusing ground glass 26 is positioned in one wall of the camera box 10 and a light shielding hood 28 is provided surrounding the ground glass in order to allow the photographer to observe the composition and degree of focus of the image projected on to ground glass 26 by lens 30 in a manner to be further described.

A curtain shutter 14 is positioned at an angle 40 which angle is typically 135 degrees from the center line between the center of lens 30 and film plane 36. This curtain shutter is functionally identical to the focal plane shutter 14 of FIG. 1, the Prior Art, except that it is somewhat larger and positioned as described above. Rollers 16 and 18 are provided to carry and move the curtain shutter in such a way that a slit shaped aperture in the curtain (not shown) can be drawn across the distance between roller 16 and 18 in a controlled manner and at a specified speed in order to provide a predetermined degree of exposure of light transmitted by lens 30 to film plane 36. Curtain shutter 14 is silvered on its side facing lens 30. Being silvered, it is capable of reflecting the image projected by lens 30 on to ground glass 26. Typically, the material of curtain shutter 14 will be a highly flexible metallic foil which can be polished to mirror-like brightness such as stainless steel, having a thickness of 0.002 inches (7.9 E-5 mm), although other materials which can be silvered or provided with a reflective coating on the side facing lens 30 will be satisfactory.

When the camera is in composing and focusing mode, the slot in curtain shutter 14 will be wound onto roller 16 and there will be no opening in the curtain shutter 14 which would allow light from lens 30 to reach film 36. Substantially, the entire surface 14 facing lens 30 will be silvered, thereby allowing substantially all the light transmitted through lens 30 to reach ground glass 26 by way of being reflected from the silvered surface of curtain shutter 14. When the shutter is released by the photographer directly or remotely, roller 18 will become actuated to draw the portion of curtain 14 wound on roller 16 from 16 to 18. This portion of the curtain wound on roller 16 contains a slot whose width determines the exposure time. A narrow slot provides a brief exposure; a wide slot provides a long exposure. Different tensions can be provided to the spring actuating rollers 16 and 18, thereby enabling the photographer to vary both the slot width and the speed that the slot traverses the projection of the film plane.

The actual mechanisms for the variety of focal plane shutters suitable for this application are well known in the art and any of them to which a reflecting surface can be applied to one side will meet the requirements of this invention, in particular the curtain shutter of the prior art Graflex, replaced with the metallic film as described above, or the metallic plate focal plane shutter as employed by Nikon Model FE a Canon will serve successfully.

Figure 4:
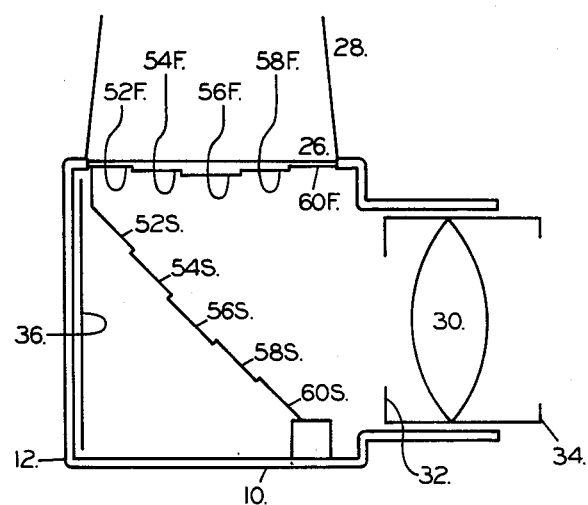
FIG. 4 is a single lens reflex camera employing my invention, having a shutter made of overlapping plates and a contoured focusing screen.

FIG. 4 shows the same camera box 10, ground glass 26, focusing hood 28 and barrel 34 containing lens 30 and diaphragm 32 as the camera of FIG. 2. The focal plane shutter 14, however, while still deployed at an angle 40 to the center line between the lens 30 and film 36 where the angle 40 is substantially 135 degrees, is composed of a series of rigid plates. These plates are silvered on the side facing the lens. However, their elements, 52S, 54S, 56S, 58S and 60S are overlapping and not all in the same plane, because in operating, the plates are required to move with respect to each other. To assure correct focus over the face of the focusing screen 26, the lower face of the focusing screen 26 is ground in flats having elevations 52F, 54F, 56F, 58F and 60F, matching the elevations of the shutter segments and assuring a perfect focus over the entire face of the focusing screen 26.

Figure 5:
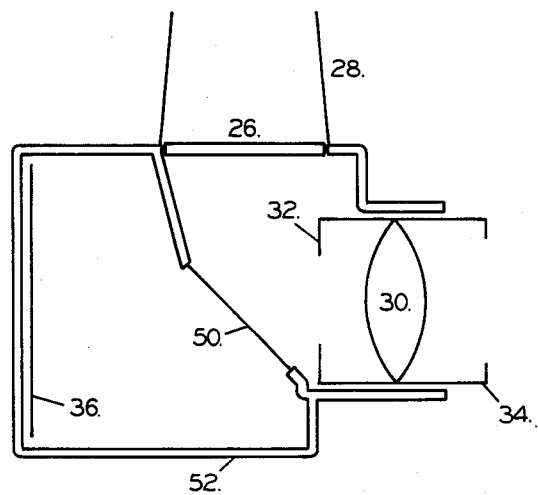
FIG. 5 is a single lens reflex camera having a shutter type known alternately as blade, leaf or guillotine.

FIG. 5 shows a camera having a lens 30 and diaphragm 32 mounted in barrel 34 adjustably mounted in box 52. Box 52 has film plane 36 positioned to receive focused light from lens 30, a shutter 50, alternately known as blade or leaf or guillotine type, is provided having the side of its blade facing lens 30 made reflective. The reflective blade 50 is positioned within the path of light flowing when shutter 50 is open from lens 30 to film plane 36. When shutter 50 is closed, its reflective blade 50 reflects light from lens 30 to the composing and focusing screen 26 which can be viewed through hood 28 or a pentaprism (not shown).

I claim:

1. A camera having a box; a film plane within the box, lens means positioned to accept light from without the box and transmit the light via a path to the film plane; composing and focusing screen means positioned without the path; and reflecting shutter means having a focusing mode and an exposure mode, said shutter means being positioned in a fixed plane within the path for intercepting light from the lens and reflecting it to the screen means during the focusing mode and allowing light from the lens to momentarily flow to the film plane during the exposure mode.

2. A camera as in claim 1 where the reflecting shutter is of the curtain type.

3. A camera as in claim 1 where the reflecting shutter is constructed of plate-like elements.

4. A camera as in claim 3 where the lens facing silvered faces of the plate-like elements have different elevations from the plane and the face of the focusing screen has matching elevations.

5. A camera as in claim 1 where the reflecting shutter is of the guillotine type.

* * * * *